United States Patent
Oyama

(10) Patent No.: US 10,310,503 B2
(45) Date of Patent: Jun. 4, 2019

(54) TRAVEL CONTROL APPARATUS FOR VEHICLE

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/057,293

(22) Filed: Mar. 1, 2016

(65) Prior Publication Data

US 2016/0259335 A1    Sep. 8, 2016

(30) Foreign Application Priority Data

Mar. 3, 2015 (JP) .................................. 2015-041602

(51) Int. Cl.
  *G05D 1/00* (2006.01)
  *G05D 1/02* (2006.01)

(52) U.S. Cl.
  CPC ......... *G05D 1/0077* (2013.01); *G05D 1/0251* (2013.01); *G05D 1/0274* (2013.01); *G05D 2201/0213* (2013.01)

(58) Field of Classification Search
  CPC .. G05D 1/0077; G05D 1/0251; G05D 1/0274; G05D 2201/0213
  USPC ........................................ 701/23, 93, 94, 96
  See application file for complete search history.

(56) References Cited

U.S. PATENT DOCUMENTS

| 5,087,969 A * | 2/1992 | Kamada ............... G05D 1/0221 348/119 |
| 6,016,996 A * | 1/2000 | Angel ..................... B64C 29/00 244/114 B |
| 6,178,379 B1 * | 1/2001 | Dwyer .................... G01S 19/15 244/175 |
| 6,415,226 B1 * | 7/2002 | Kozak ............... G01C 21/3461 340/988 |

(Continued)

FOREIGN PATENT DOCUMENTS

| JP | 2005147713 A * | 6/2005 |
| JP | 2011-073529 A | 4/2011 |
| JP | 2011-189803 A | 9/2011 |

*Primary Examiner* — Angelina Shudy

(74) *Attorney, Agent, or Firm* — McDermott Will & Emery LLP

(57) ABSTRACT

A travel control apparatus for a vehicle includes: a frontward environment recognition unit that obtains frontward environment information by recognizing a frontward environment of the vehicle; a frontward environment information reliability calculator that calculates a reliability of the frontward environment information; a map information storage unit that stores map information relating to a travel region of the vehicle on the basis of position information indicating a position of the vehicle; a map information updating unit that updates the map information while calculating a reliability of the map information; a control information selector that compares the reliability of the frontward environment information with update information relating to the map information, and selects either one of the frontward environment information and the map information as information to be used during automatic driving control; and an automatic driving control execution unit that executes the automatic driving control based on the selected information.

16 Claims, 13 Drawing Sheets

(56) References Cited

U.S. PATENT DOCUMENTS

| | | | |
|---|---|---|---|
| 6,438,491 B1* | 8/2002 | Farmer | B60W 30/16 340/435 |
| 6,662,105 B1* | 12/2003 | Tada | G01C 21/34 340/990 |
| 6,760,652 B2* | 7/2004 | Ogasawara | G01C 21/26 701/36 |
| 7,805,242 B2* | 9/2010 | Fujimoto | B60T 7/22 701/36 |
| 8,126,642 B2* | 2/2012 | Trepagnier | G01S 17/023 701/423 |
| 8,862,384 B2* | 10/2014 | Stahlin | G01C 21/28 701/400 |
| 9,216,746 B2* | 12/2015 | Ham | G01C 21/28 |
| 9,384,394 B2* | 7/2016 | Joshi | G01C 21/20 |
| 9,541,408 B2* | 1/2017 | Stahlin | G01C 21/32 |
| 9,713,983 B2* | 7/2017 | Takaki | B60R 1/00 |
| 9,738,314 B2* | 8/2017 | Oyama | B62D 15/025 |
| 9,811,092 B2* | 11/2017 | Obuchi | G05D 1/0293 |
| 9,903,725 B2* | 2/2018 | Sato | G05D 1/0088 |
| 9,958,865 B2* | 5/2018 | Hoskeri | G01C 21/34 |
| 2002/0080617 A1* | 6/2002 | Niwa | B60Q 1/085 362/465 |
| 2002/0080618 A1* | 6/2002 | Kobayashi | B60Q 1/085 362/466 |
| 2002/0161513 A1* | 10/2002 | Bechtolsheim | G01C 21/3667 701/454 |
| 2003/0200259 A1* | 10/2003 | Tsuge | G01C 21/32 709/203 |
| 2004/0085201 A1* | 5/2004 | Dubrovin | B60Q 1/085 340/458 |
| 2004/0094912 A1* | 5/2004 | Niwa | B60G 17/0165 280/5.518 |
| 2005/0169000 A1* | 8/2005 | Hasegawa | B60Q 1/085 362/466 |
| 2005/0283699 A1* | 12/2005 | Nomura | G01C 21/32 714/746 |
| 2007/0257837 A1* | 11/2007 | Watanabe | G01S 19/49 342/357.37 |
| 2008/0036576 A1* | 2/2008 | Stein | B60R 1/00 340/425.5 |
| 2010/0100284 A1* | 4/2010 | Kudo | B62D 15/025 701/42 |
| 2010/0103033 A1* | 4/2010 | Roh | G01S 19/40 342/357.32 |
| 2010/0109945 A1* | 5/2010 | Roh | G01S 19/49 342/357.32 |
| 2010/0332050 A1* | 12/2010 | Kobayashi | B60T 8/17557 701/1 |
| 2011/0066313 A1* | 3/2011 | Larsson | G09B 29/005 701/25 |
| 2011/0307171 A1* | 12/2011 | Waite | G01C 21/30 701/421 |
| 2012/0136549 A1* | 5/2012 | Bradai | B60Q 1/085 701/93 |
| 2012/0150428 A1* | 6/2012 | Niem | G08G 1/096716 701/409 |
| 2012/0290146 A1* | 11/2012 | Dedes | G08G 1/163 701/1 |
| 2013/0024109 A1* | 1/2013 | Hosotani | G01C 21/3626 701/428 |
| 2013/0253750 A1* | 9/2013 | Otake | B60W 10/06 701/22 |
| 2014/0019044 A1* | 1/2014 | Zanutta | G01S 19/34 701/469 |
| 2014/0244169 A1* | 8/2014 | Stahlin | G01C 21/20 701/523 |
| 2015/0019121 A1* | 1/2015 | Gao | G06T 3/0012 701/409 |
| 2015/0231977 A1* | 8/2015 | Morita | B60L 11/1809 320/109 |
| 2015/0316383 A1* | 11/2015 | Donikian | G01C 21/165 701/408 |
| 2015/0332101 A1* | 11/2015 | Takaki | B60R 1/00 382/104 |
| 2015/0353085 A1* | 12/2015 | Lee | B60W 30/10 701/533 |
| 2016/0061612 A1* | 3/2016 | You | G01C 21/26 701/409 |
| 2016/0068267 A1* | 3/2016 | Liu | B64C 39/024 701/11 |
| 2016/0097862 A1* | 4/2016 | Yim | G01S 19/49 701/472 |
| 2016/0121906 A1* | 5/2016 | Matsuno | B60K 28/10 701/23 |
| 2016/0132055 A1* | 5/2016 | Matsuno | B60W 50/10 701/23 |
| 2016/0132056 A1* | 5/2016 | Yoshino | G01S 17/08 701/23 |
| 2016/0178381 A1* | 6/2016 | Lynch | G01C 21/30 701/23 |
| 2016/0259335 A1* | 9/2016 | Oyama | G05D 1/0077 |
| 2016/0259814 A1* | 9/2016 | Mizoguchi | G06F 17/30241 |
| 2016/0280262 A1* | 9/2016 | Oyama | B62D 15/025 |
| 2016/0292998 A1* | 10/2016 | Obuchi | G05D 1/0293 |
| 2016/0377437 A1* | 12/2016 | Brannstrom | G01C 21/165 701/501 |
| 2017/0057545 A1* | 3/2017 | Laur | B62D 15/0265 |
| 2017/0072963 A1* | 3/2017 | Matsuno | B60K 28/16 |
| 2017/0122749 A1* | 5/2017 | Urano | G01C 21/30 |
| 2017/0123434 A1* | 5/2017 | Urano | B60Q 9/008 |
| 2017/0227647 A1* | 8/2017 | Baik | G01S 17/936 |
| 2017/0351256 A1* | 12/2017 | Kumakiri | B60R 16/0231 |
| 2018/0004200 A1* | 1/2018 | Gariepy | G05D 1/024 |
| 2018/0111613 A1* | 4/2018 | Oh | B60W 30/12 |
| 2018/0157934 A1* | 6/2018 | Hu | G06K 9/00791 |
| 2018/0267172 A1* | 9/2018 | Oh | G01S 17/936 |
| 2018/0313652 A1* | 11/2018 | Passmann | G01C 21/28 |
| 2019/0003847 A1* | 1/2019 | Song | G01C 21/3602 |

* cited by examiner

TRAVEL CONTROL APPARATUS FOR VEHICLE

CROSS-REFERENCE TO RELATED APPLICATIONS

The present application claims priority from Japanese Patent Application No. 2015-041602, filed on Mar. 3, 2015, the entire contents of which are hereby incorporated by reference.

BACKGROUND

1. Technical Field

The present invention relates to a travel control apparatus for a vehicle that employs an automatic driving technique.

2. Related Art

Recently, various apparatuses employing automatic driving techniques have been developed and proposed for use in vehicles with the aim of allowing a driver to drive the vehicle in increased comfort and more safely. For example, Japanese Unexamined Patent Application Publication No. 2011-189803 (JP-A) discloses a technique employed in a vehicle control apparatus that restricts a control amount of a part of a plurality of actuators such as an engine, an automatic transmission, an electric power steering apparatus, a variable steering gear ratio system, and a brake oil pressure control apparatus in accordance with a reliability of information detected by a camera, a radar, a navigation system, and so on. More specifically, a lateral direction of a vehicle equipped with the vehicle control apparatus is recognized by the camera, a travelable region in the lateral direction is set in accordance with the reliability of the camera, an obstruction in a front-rear direction of the vehicle is detected by the radar, a travelable region in the front-rear direction of the vehicle is set in accordance with the reliability of the radar, and in response to information from the navigation system, travelable regions in the front-rear and left-right directions are set in accordance with the reliability of the navigation system (a condition of a global positioning system (GPS) satellite). The travelable regions in the front-rear direction and the left-right direction of the vehicle are then compared with the travelable regions set in accordance with the reliability of the navigation system, and the travelable regions having smaller values are confirmed as the travelable regions in the respective directions. By confirming the travelable regions in this manner, travel control executed in the lateral direction by the electric power steering apparatus and the variable steering gear ratio system can be restricted in a case where the reliability of the information detected by the camera is low, and a control amount applied by the brake oil pressure control apparatus can be restricted in a case where the reliability of the information detected by the radar is low.

Incidentally, in the case of the vehicle control apparatus disclosed in JP-A, as described above, the front-rear direction travelable region set in accordance with the reliability of the radar and the left-right direction travelable region set in accordance with the reliability of the camera are compared with the travelable regions set in accordance with the reliability of the navigation system, and the travelable regions having the smaller values are confirmed as the travelable regions in the respective directions. When the reliability of the camera (and image information obtained from the camera) is low, for example, such that the left-right direction travelable region set in accordance with the reliability of the camera decreases in size, the final left-right direction travelable region is also set to be small, with the result that vehicle control is not performed in the lateral direction even though map information provided by the navigation system exhibits high reliability. In practical terms, therefore, automatic driving control becomes difficult. Hence, automatic driving of the vehicle may be continued using the map information, but depending on the provided map information, it may be impossible to implement precise, stable automatic driving continuously without appropriately varying the form of the automatic driving. Moreover, it must be possible to shift the control appropriately in response to steering input from the driver without contradicting the steering intentions of the driver.

SUMMARY OF THE INVENTION

It is desirable to provide a travel control apparatus for a vehicle with which precise, stable automatic driving control can be implemented by comparing a reliability of frontward environment information with update information relating to map information, and appropriately selecting the information to be used in the automatic driving control.

An aspect of the present invention provides a travel control apparatus for a vehicle, the travel control apparatus including: a frontward environment recognition unit that obtains frontward environment information by recognizing a frontward environment of the vehicle, a frontward environment information reliability calculator that calculates a reliability of the frontward environment information in a predetermined manner, a map information storage unit that stores map information relating to a travel region of the vehicle on the basis of position information indicating a position of the vehicle, a map information updating unit that updates the map information while calculating a reliability of the map information in a predetermined manner, a control information selector that compares the reliability of the frontward environment information with update information relating to the map information, and selects either one of the frontward environment information and the map information as information to be used during automatic driving control, and an automatic driving control execution unit that executes the automatic driving control on the basis of the information selected by the control information selector.

DETAILED DESCRIPTION

An implementation of the present invention will be described below on the basis of the drawings.

Figure 1:
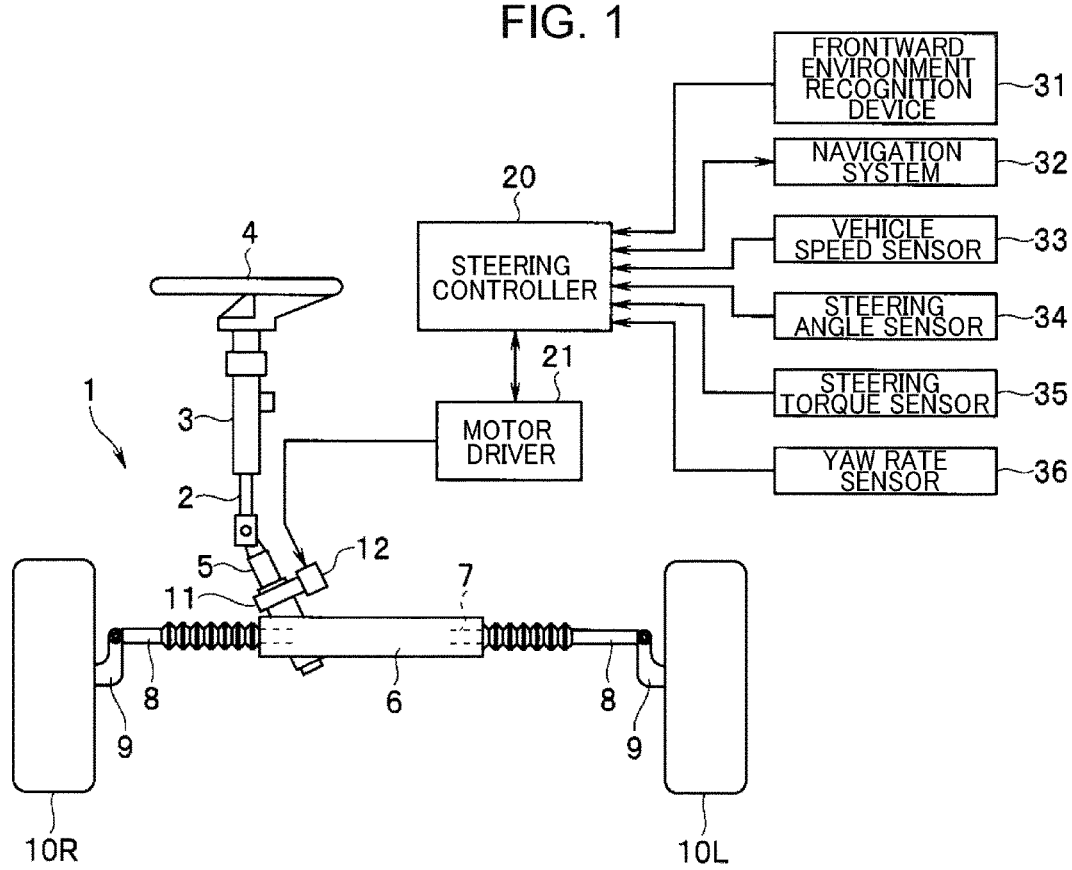
FIG. 1 is an illustrative view illustrating a configuration of a steering system of a vehicle according to an implementation of the present invention.
Figure 2:
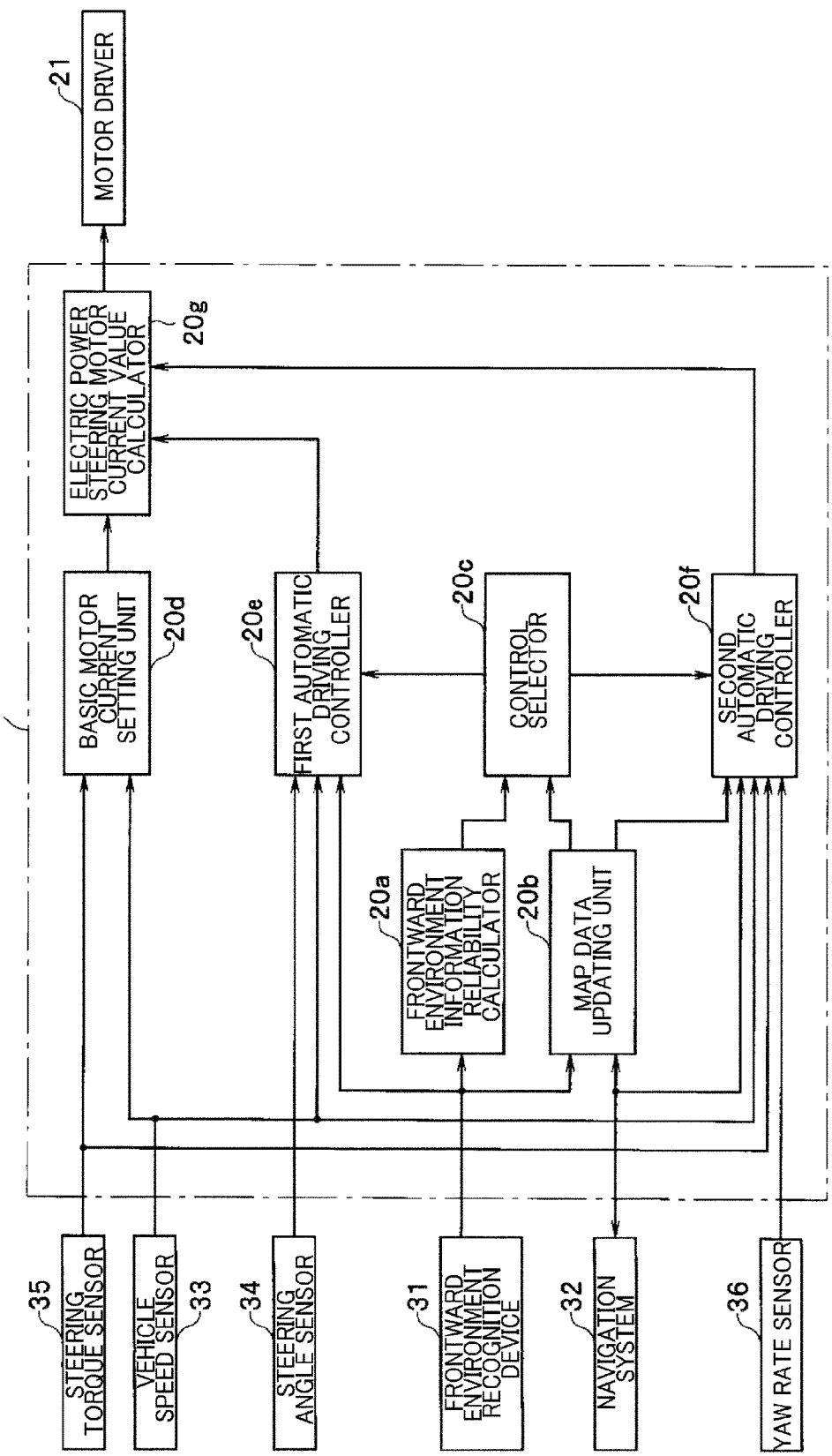
FIG. 2 is a function block diagram of a steering controller according to an implementation of the present invention.

In FIG. 1, a reference numeral 1 denotes an electric power steering device capable of setting a steering angle freely, independently of driver input. In the electric power steering device 1, a steering shaft 2 is supported on a vehicle body frame, not illustrated in the drawing, to be free to rotate via a steering column 3 such that one end thereof extends to a driving seat side and another end extends to an engine room side. A steering wheel 4 is fixed to the driving seat side end of the steering shaft 2, and a pinion shaft 5 is connected to the end of the steering shaft 2 that extends to the engine room side.

A steering gearbox 6 that extends in a vehicle width direction is disposed in the engine room, and a rack shaft 7 is inserted into and supported by the steering gearbox 6 so as to be free to reciprocate. A pinion formed on the pinion shaft 5 meshes with a rack (not illustrated) formed on the rack shaft 7, and as a result, a rack and pinion type steering gear mechanism is formed.

Further, left-right ends of the rack shaft 7 project from respective ends of the steering gearbox 6, and front knuckles 9 are connected to the respective ends via a die rod 8. The front knuckles 9 support left and right wheels 10L, 10R serving as steered wheels to be free to rotate, and are supported steerably on the vehicle body frame. Hence, when the steering wheel 4 is operated such that the steering shaft 2 and the pinion shaft 5 rotate, the rack shaft 7 moves in a left-right direction in response to the rotation of the pinion shaft 5, and in response to this movement, the front knuckles 9 rotate about kingpin shafts (not illustrated) such that the left and right wheels 10L, 10R are steered in the left-right direction.

Furthermore, an electric power steering motor (an electric motor) 12 is connected to the pinion shaft 5 via an assist transmission mechanism 11, and the electric motor 12 applies steering torque in order to assist steering torque applied to the steering wheel 4 and ensure that a set target steering angle is achieved. The electric motor 12 is driven by a motor driver 21 by outputting an electric power steering motor current value Icmd to the motor driver 21 from a steering controller 20, to be described below, as a control output value.

A frontward environment recognition device 31 that obtains frontward environment information by recognizing a frontward environment of the vehicle, a navigation system 32 that detects position information (latitude and longitude, a movement direction, and so on) of the vehicle, displays the vehicle position on map information, and provides route guidance to a destination, a vehicle speed sensor 33 that detects a vehicle speed V, a steering angle sensor 34 that detects a steering angle (an actual steering angle) θp, a steering torque sensor 35 that detects a steering torque Td, and a yaw rate sensor 36 that detects a yaw rate (dθ/dt) of the vehicle are connected to the steering controller 20.

The frontward environment recognition device 31 is constituted by a set of CCD cameras attached at fixed intervals to a front side of a vehicle cabin ceiling, for example, in order to capture stereo images of subjects on the exterior of the vehicle from different viewpoints, and a stereo image processor that processes image data obtained from the CCD cameras.

The processing implemented by the stereo image processor of the frontward environment recognition device 31 on the image data from the CCD cameras is as follows, for example. First, a distance image is generated by determining distance information in relation to a set of stereo images captured by the CCD cameras in an advancement direction of the vehicle from deviation amounts of corresponding positions.

Figure 10:
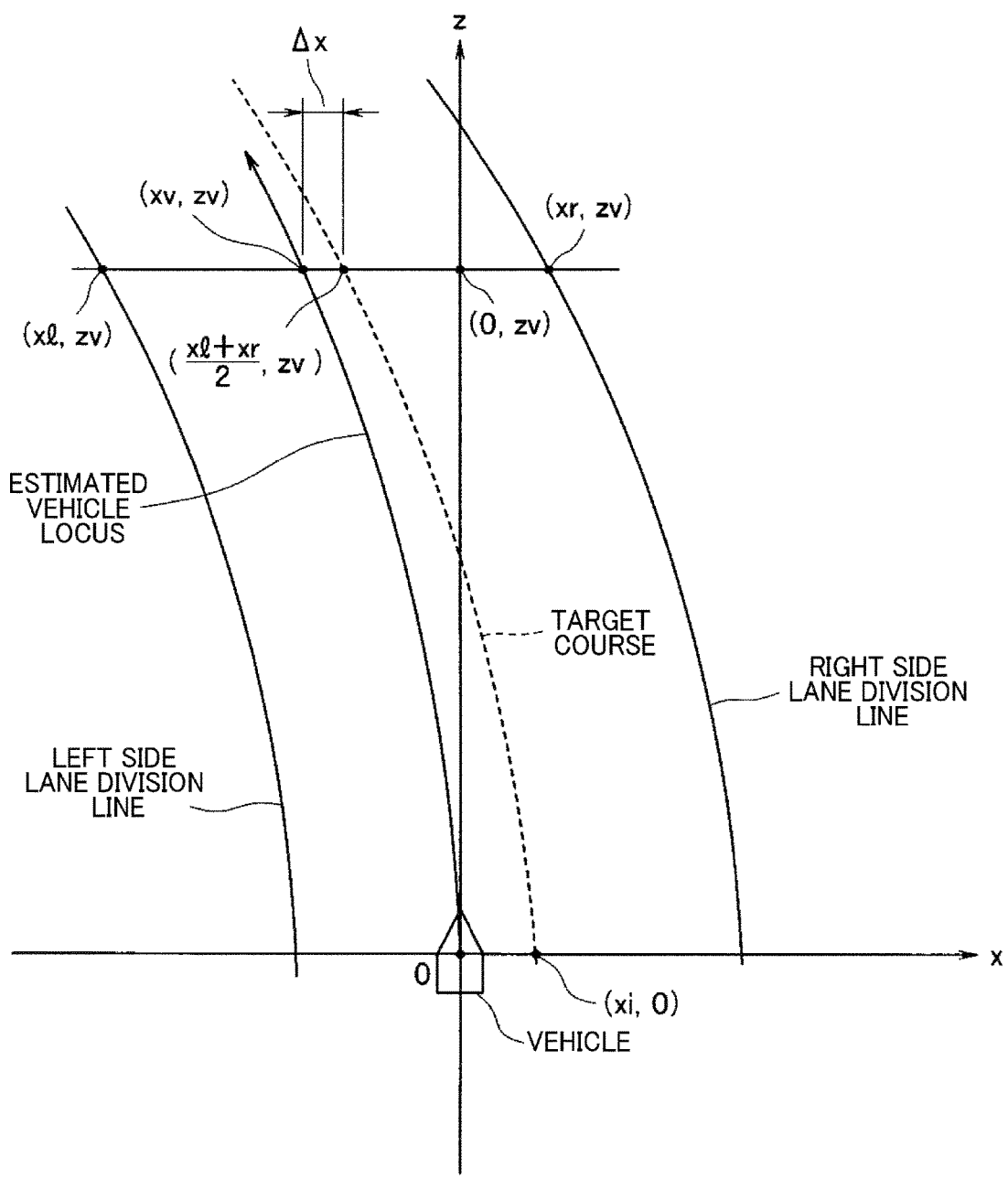
FIG. 10 is an illustrative view illustrating lateral position feedback control according to an implementation of the present invention.

To recognize data indicating a lane division line such as a white line, luminance variation in a width direction of a road is evaluated on the basis of the knowledge that a white line exhibits higher luminance than a road surface, whereupon a left-right position of the white line on an image plane is specified on the image plane. An actual spatial position (x, y, z) of the white line is calculated using a conventional coordinate conversion formula on the basis of a position (i, j) on the image plane and a parallax calculated in relation to the position, or in other words on the basis of the distance information. In this implementation, as illustrated in FIG. 10, for example, a coordinate system of an actual space set using the position of the vehicle as a reference is set such that the road surface directly below the center of the stereo camera serves as an origin, the vehicle width direction serves as an x axis, a vehicle height direction serves as a y axis, and a vehicle length direction (a distance direction) serves as a z axis. At this time, when the road is flat, an x-z plane (y=0) is in alignment with the road surface. A road model is expressed by dividing a travel lane of the vehicle on the road into a plurality of sections in the distance direction, approximating left and right white lines in each section in a predetermined manner, and connecting the approximated white lines. Note that in this implementation, an example in which the shape of the travel road is recognized on the basis of images from the set of CCD cameras was described, but instead, the shape of the travel road may be determined on the basis of image information from a monocular camera or a color camera. In one implementation, the frontward environment recognition device 31 may be provided as a "frontward environment recognition unit".

The navigation system 32 is a conventional system that, for example, obtains position information (latitude and longitude) indicating the position of the vehicle by receiving radio waves from a GPS satellite, obtains the vehicle speed V from the vehicle speed sensor 33, and obtains movement direction information from a geomagnetic sensor, a gyro sensor, or the like. The navigation system 32 is configured to include a navigation ECU that generates route information used to realize a navigation function, a map database storing map information (supplier data and data updated by the steering controller 20), and a display such as a liquid crystal display, for example (none of which are illustrated in the drawings).

Figure 12:
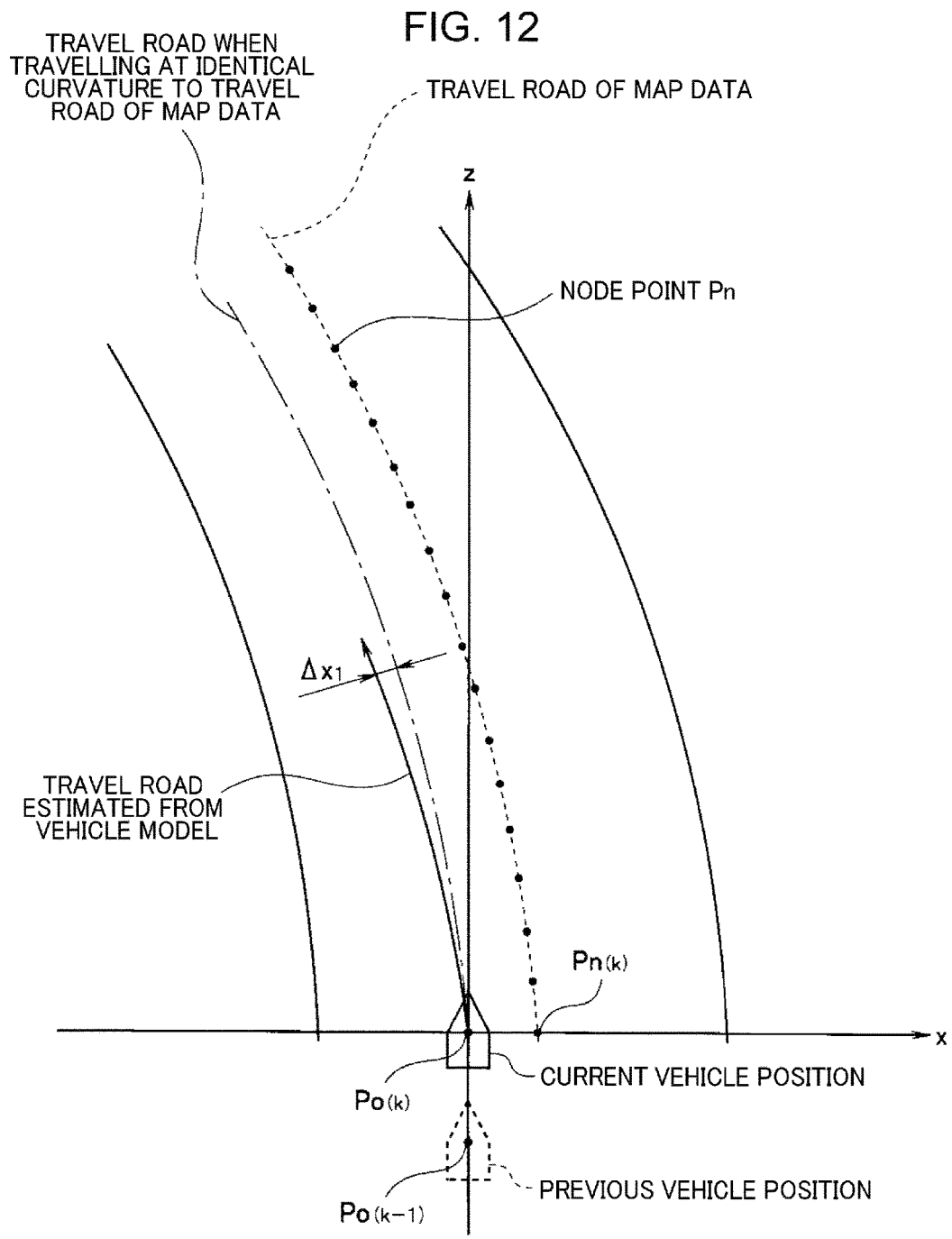
FIG. 12 is an illustrative view illustrating a lateral deviation generated when travelling on a curve, according to an implementation of the present invention.
Figure 13:
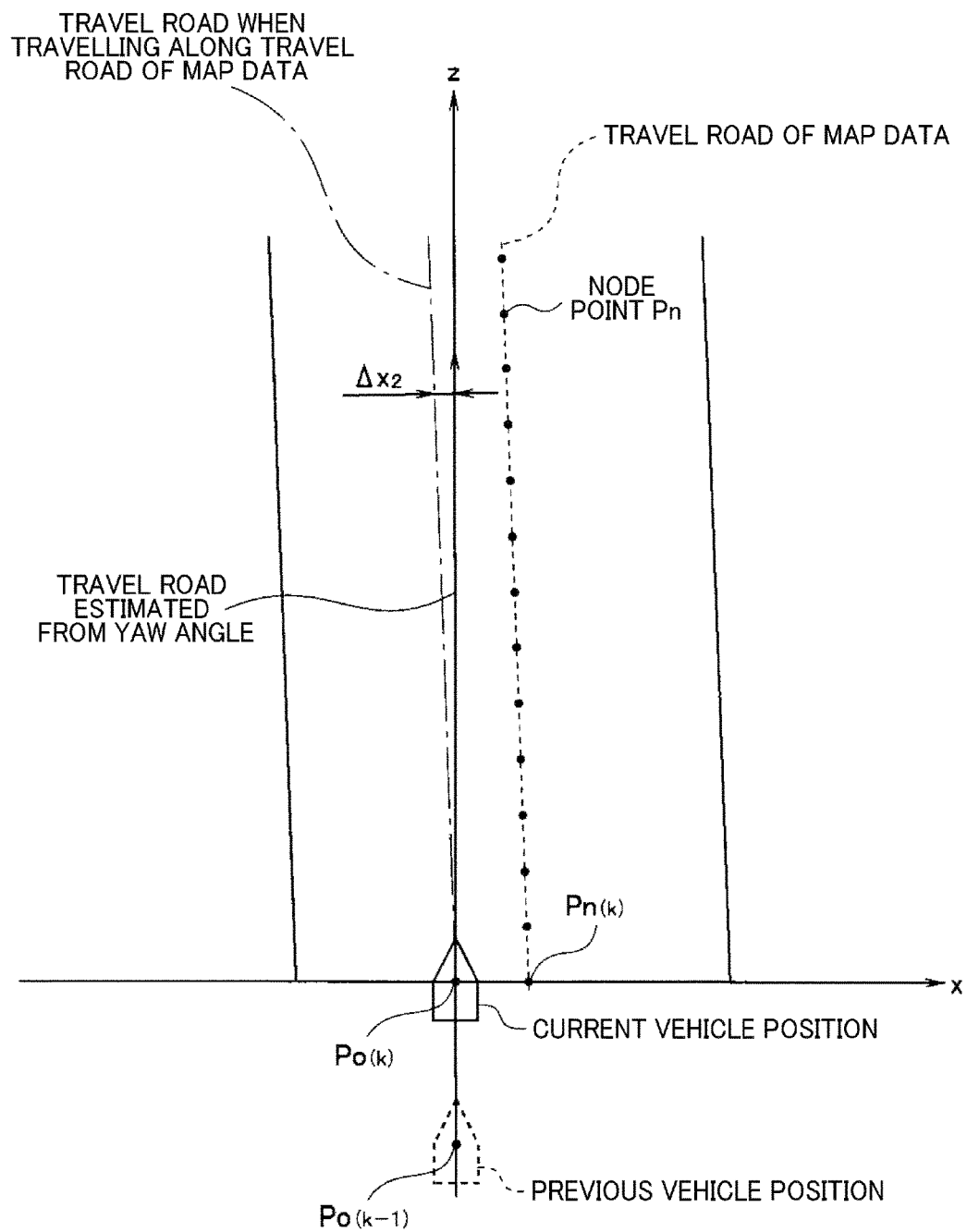
FIG. 13 is an illustrative view illustrating a lateral deviation generated when travelling on a straight road, according to an implementation of the present invention.

The navigation ECU displays route information to a destination specified by a user so as to be superimposed on a map image displayed on the display, and displays the current position of the vehicle so as to be superimposed on the map image displayed on the display on the basis of information indicating the detected position, speed, travel direction, and so on of the vehicle. Further, the map database stores information required to form a road map, such as node data and facility data. The node data relate to positions and shapes of roads constituting the map image, and include, for example, data indicating coordinates (latitude and longitude) of a point (a node point Pn) on a road, such as a bifurcation point (an intersection) of the road, a direction and a classification (information indicating an expressway, a trunk road, or an urban road, for example) of the road that includes the node point Pn, and a road type (a straight section, an arc section (an arc-shaped curve), or a clothoid curve section (a gentle curve)) and a curve curvature κ (or a curve radius) at the node point Pn. Therefore, as illustrated in FIG. 12 or 13, the travel road of the vehicle is specified from the map position in which the current position of the vehicle is superimposed, and travel road information such as the curve curvature κ (or the curve radius) of the road and the direction of the road is obtained from information indicating a node point Pn(k) that is closest to a position Po(k) of the vehicle using the travel road of the vehicle as a target advancement road. Further, the facility data include data relating to facilities existing in the vicinity of the respective node points Pn, and are stored in association with the node data (or link data indicating links on which the nodes exist). In one implementation, the navigation system 32 may be provided as a "map information storage unit".

Figure 3:
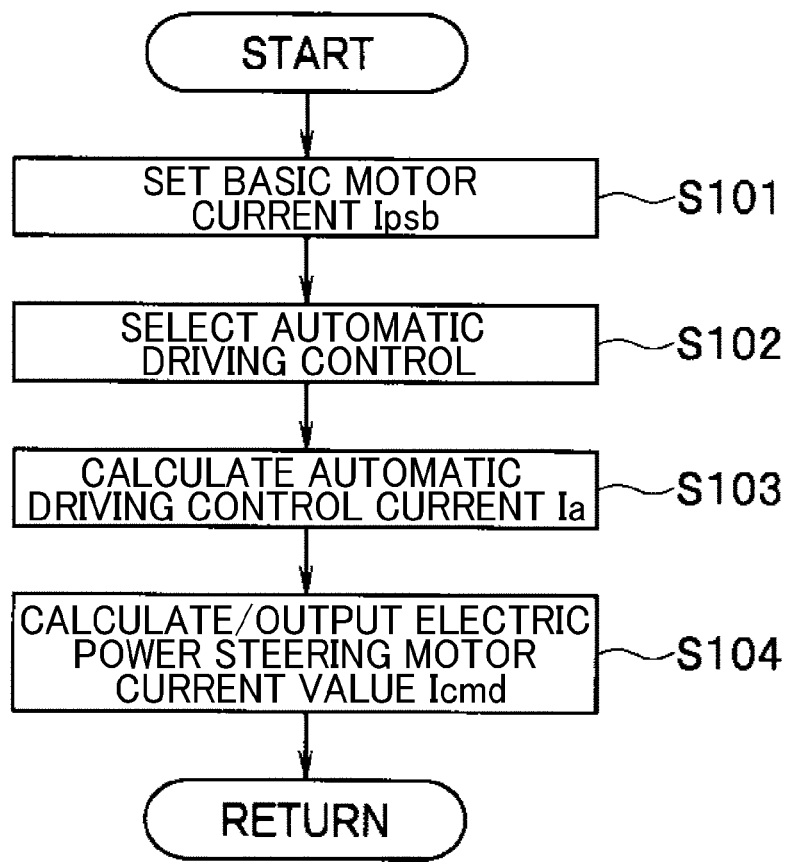
FIG. 3 is a flowchart illustrating an automatic driving control program according to an implementation of the present invention.

On the basis of respective input signals described above, the steering controller 20 implements a flowchart illustrated in FIG. 3. First, in step (abbreviated to "S" hereafter) 101, the steering controller 20 calculates a basic motor current Ipsb in accordance with driver input, calculates a reliability of the frontward environment information in a predetermined manner, and calculates a reliability of the map information in a predetermined manner while updating the map information. In S102, the steering controller 20 compares the reliability of the frontward environment information with update information relating to the map information, and selects either one of the frontward environment information and the map information as information to be used during automatic driving control. In S103, the steering controller 20 calculates an automatic driving control current Ia in accordance with the selected automatic driving control, and in S104, the steering controller 20 calculates the electric power steering motor current value Icmd and outputs the calculated electric power steering motor current value Icmd to the motor driver 21.

For this purpose, the steering controller 20 is mainly constituted by a frontward environment information reliability calculator 20a, a map data updating unit 20b, a control selector 20c, a basic motor current setting unit 20d, a first automatic driving controller 20e, a second automatic driving controller 20f, and an electric power steering motor current value calculator 20g.

The frontward environment information based on the image information is input into the frontward environment information reliability calculator 20a from the frontward environment recognition device 31. Then, as disclosed in Japanese Unexamined Patent Application Publication No. 2011-73529, for example, the frontward environment information reliability calculator 20a calculates a reliability in accordance with a magnitude of a white line characteristic amount arranged linearly on a lane image captured by a camera within a processing area determined on the lane. The magnitude of the white line characteristic amount is set at 1 when an ideal straight solid white line exists within the area, and is determined to be 0 when no characteristic amount exists or it cannot be determined that the characteristic amount is arranged linearly. When, for example, a reliability equaling or exceeding a preset threshold (0.8, for example) is calculated, the reliability of the frontward environment information is determined to be "high", and when a lower reliability than the threshold is calculated, the reliability of the frontward environment information is determined to be "low". The frontward environment information reliability calculator 20a then outputs a determination result obtained in relation to the reliability of the frontward environment information to the control selector 20c.

The frontward environment information (the curve curvature κ and an advancement direction (a yaw angle) of the vehicle) based on the image information from the frontward environment recognition device 31 and the map information (the curve curvature κ and the lane direction) from the navigation system 32 are input into the map data updating unit 20b. Next, for example, the map data updating unit 20b compares the curve curvature κ of the lane obtained from the image information with the curve curvature κ of the lane obtained from the map information, and compares the vehicle advancement direction (the yaw angle) obtained from the image information with the lane direction obtained from the map information. When differences between the respective values are small, the map data updating unit 20b leaves the map data as is, sets the reliability of the map data at a preset maximum reliability value (1, for example), and increments a number of updates. Note that the reliability is either one of a value set initially by a supplier and a value set in advance and gradually updated in accordance with vehicle conditions (yaw rate variation) during the process for updating the map data, the frontward environment information, and a reception condition from the GPS satellite. Further, when the difference between the curve curvatures κ or the difference between the directions is large, a reliability of buffer data is compared with a reliability of the newly obtained data, and when the reliability of the newly obtained data is higher than the reliability of the buffer data, the reliability of the map data is left as is, the buffer data are updated by applying respective weightings to the buffer data and the newly obtained data on the basis of the reliability of the data, and the number of updates is incremented. Conversely, when the reliability of the newly obtained data is lower than the reliability of the buffer data, the reliability of the map data is left as is, the buffer data are not updated, and the number of updates is incremented.

Hence, when a value obtained by multiplying the reliability by the number of updates is not less than a set value, for example, the map data updating unit 20b updates the map information. When a reliability equaling or exceeding the preset threshold (0.8, for example) is calculated in relation to the map data, for example, the reliability of the map information is determined to be "high", and when a lower reliability than the threshold is calculated, the reliability of the map information is determined to be "low". Furthermore, when the data indicate that the map information has been updated within a preset time period (six months, for example), the map information is determined to be "recent", and when the data have not been updated within this period, the map information is determined to be "old". The map data updating unit 20b then outputs a determination result obtained in relation to update information (the reliability and the update time) of the map information to the control selector 20c. Moreover, the map information updated by the map data updating unit 20b is output to the navigation system 32 and the second automatic driving controller 20f together with the update information. In one implementation, the map data updating unit 20b may serve as both a "map information updating unit" and a "map information storage unit".

Figure 4:
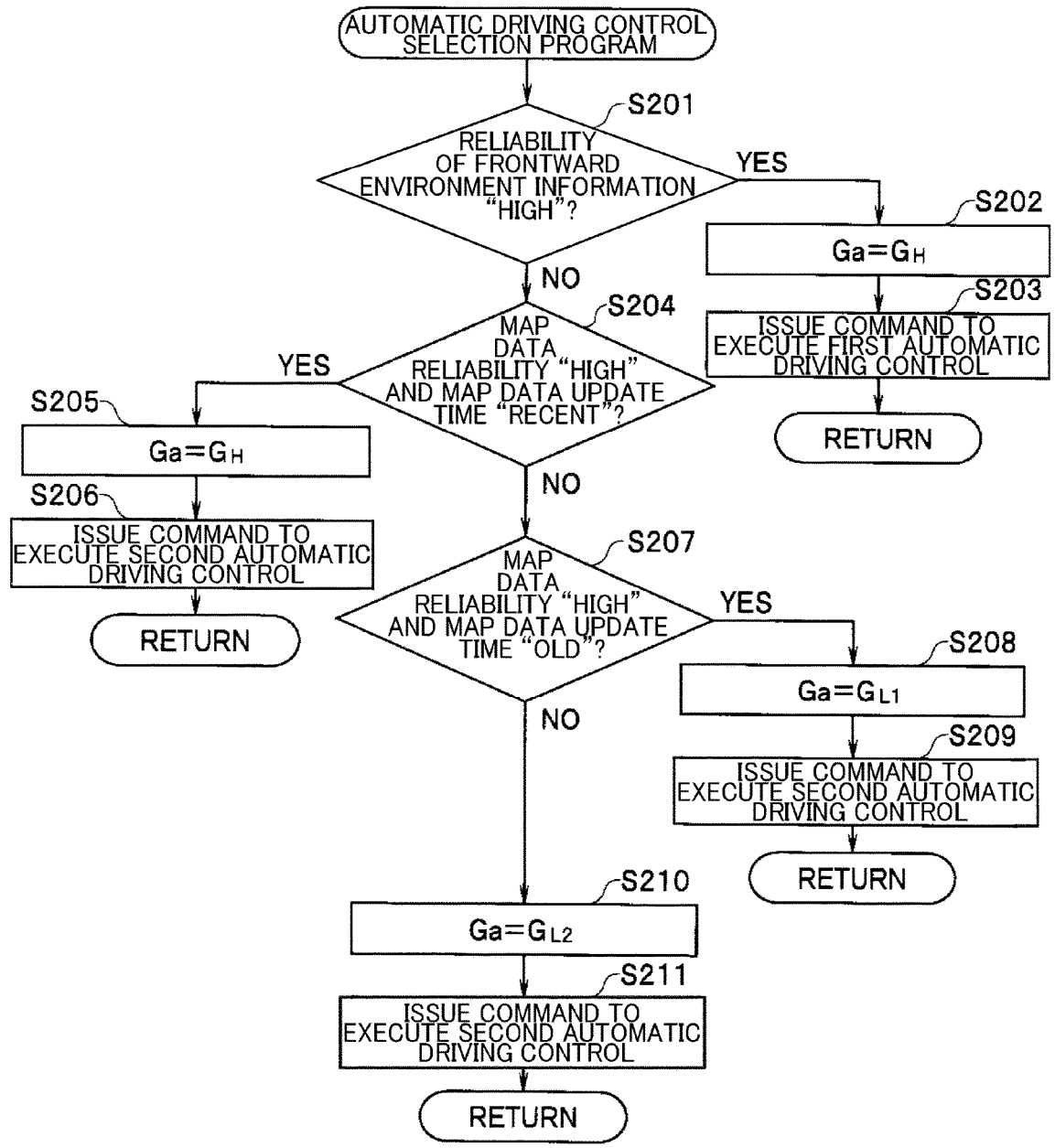
FIG. 4 is a flowchart illustrating an automatic driving control selection program according to an implementation of the present invention.

The determination result obtained in relation to the reliability of the frontward environment information is input into the control selector 20c from the frontward environment information reliability calculator 20a, and the determination result obtained in relation to the update information (the reliability and the update time) of the map information is input into the control selector 20c from the map data updating unit 20b. The control selector 20c then selects automatic driving control in accordance with an automatic driving control selection program illustrated in FIG. 4, for example, and outputs a selection result to the first automatic driving controller 20e or the second automatic driving controller 20f together with a control gain.

Figure 7:
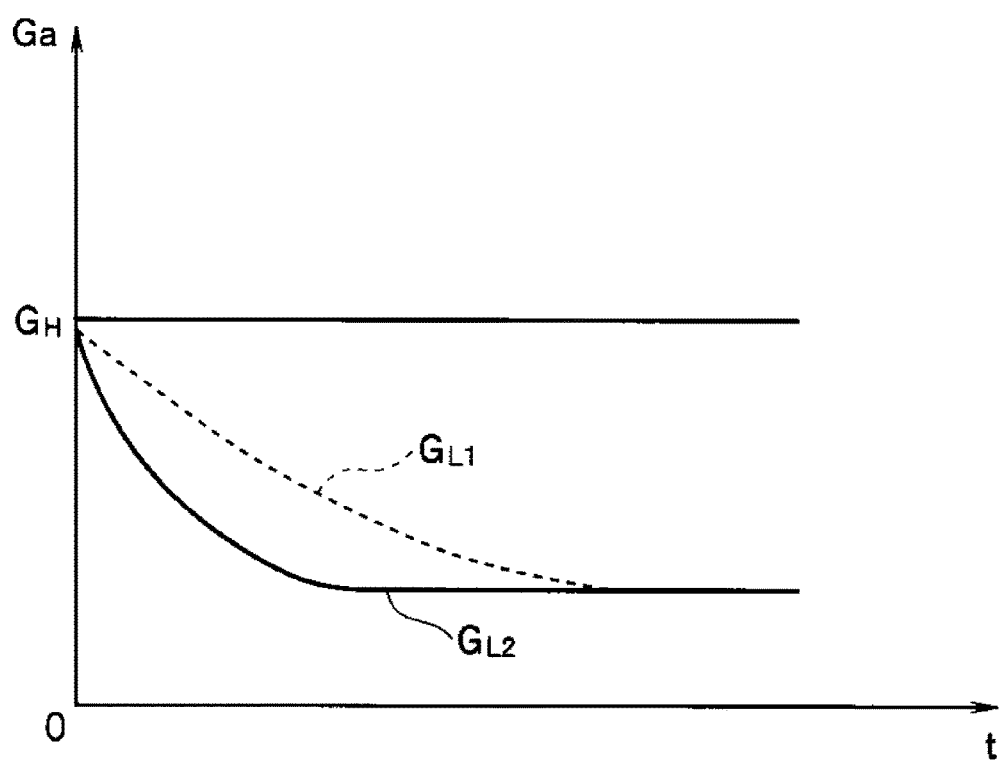
FIG. 7 is an illustrative view illustrating an automatic driving control gain according to an implementation of the present invention.

In the automatic driving control selection program, first, in S201, a determination is made as to whether or not the reliability of the frontward environment information is "high". When the reliability of the frontward environment information is determined to be "high", the routine advances to S202, where, as illustrated in FIG. 7, a control gain Ga of the automatic driving control is set at a maximum value GH. The routine then advances to S203, where a command is issued to the first automatic driving controller 20e to execute first automatic driving control, to be described below, on the basis of the frontward environment information. The routine is then terminated.

Further, when the reliability of the frontward environment information is determined not to be "high" in S201 (in other words, when the reliability of the frontward environment information is determined to be "low"), the routine advances to S204, where a determination is made as to whether or not the reliability of the map data is "high" and the update time of the map data is "recent".

When the reliability of the map data is "high" and the update time of the map data is "recent", the routine advances to S205, where the control gain Ga of the automatic driving control is set at the maximum value GH (see FIG. 7). The routine then advances to S206, where a command is issued to the second automatic driving controller 20f to execute second automatic driving control, to be described below, on the basis of the map information. The routine is then terminated.

Further, when it is determined in S204 that the reliability of the map data is not "high" and the update time of the map data is not "recent", the routine advances to S207, where a determination is made as to whether or not the reliability of the map data is "high" and the update time of the map data is "old".

When it is determined as a result of the determination in S207 that the reliability of the map data is "high" and the update time of the map data is "old", the routine advances to S208, where the control gain Ga of the automatic driving control is set to shift gently to a lower control gain GL1 (see FIG. 7) than the control gain GH. The routine then advances to S209, where a command is issued to the second automatic driving controller 20f to execute the second automatic driving control, to be described below, on the basis of the map information. The routine is then terminated.

Conversely, when it is determined as a result of the determination in S207 that the reliability of the map data is not "high" and the update time of the map data is not "old" (i.e. when the reliability of the map data is "low"), the routine advances to S210, where the control gain Ga of the automatic driving control is set to shift rapidly to a lower control gain GL2 (see FIG. 7) than the control gain GH. The routine then advances to S211, where a command is issued to the second automatic driving controller 20f to execute the second automatic driving control, to be described below, on the basis of the map information. The routine is then terminated.

Hence, when the reliability of the frontward environment information is determined to be "high", the control selector 20c executes automatic driving control reliably on the basis of the frontward environment information, and when the reliability of the frontward environment information is determined to be "low", the control selector 20c executes automatic driving control on the basis of the map information in accordance with the reliability and the update time of the map information. More specifically, when the reliability of the map information is high and the update time is recent, automatic driving control is executed reliably on the basis of the map information. Further, when the reliability of the map information is high but the update time is old, automatic driving control in which the driver can easily intervene is executed gently on the basis of the map information. Moreover, when the reliability of the map information is low, automatic driving control in which the driver can easily intervene is executed rapidly on the basis of the map information.

Figure 8:
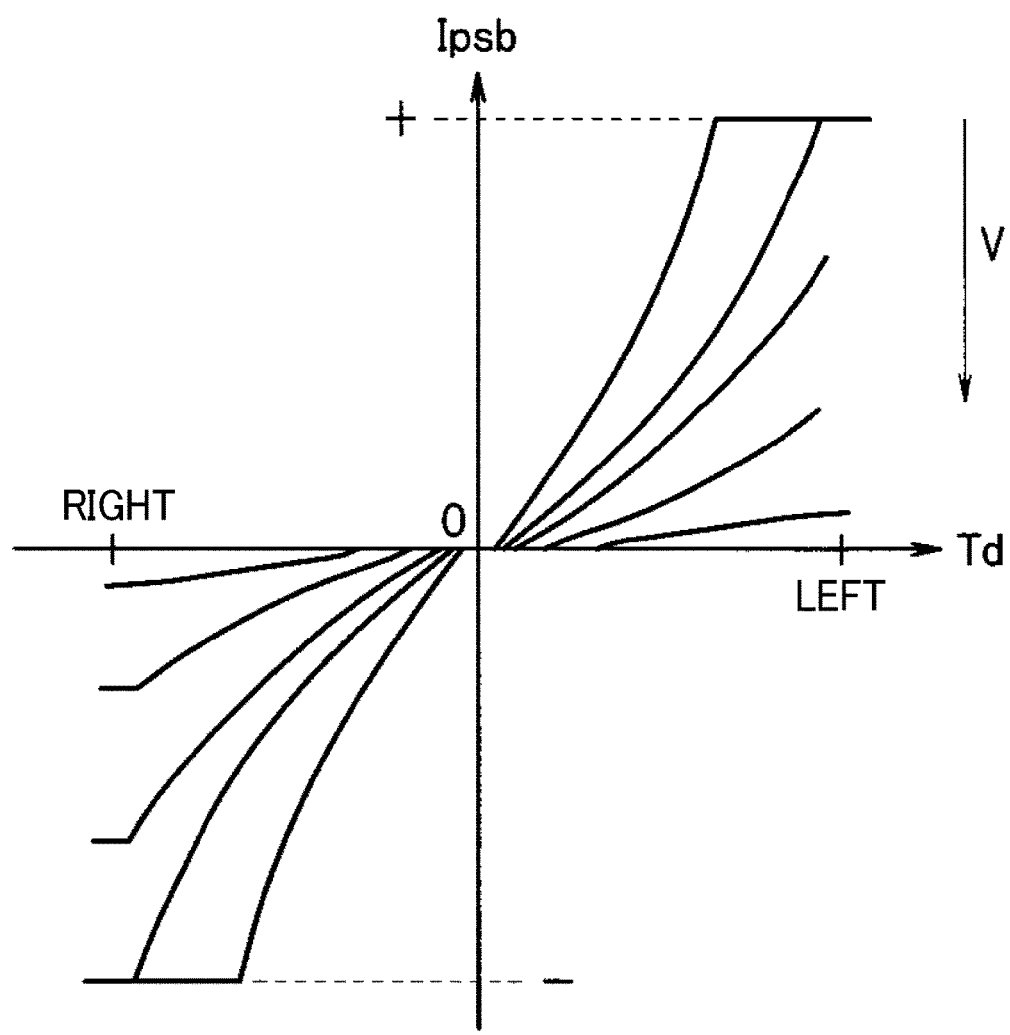
FIG. 8 is an illustrative view illustrating an example of a steering torque—electric motor basic current value characteristic of an electric power steering motor according to an implementation of the present invention.

The vehicle speed V from the vehicle speed sensor 33 and the steering torque Td from the steering torque sensor 35 are input into the basic motor current setting unit 20d. The basic motor current setting unit 20d then sets the basic electric motor current value Ipsb by referring to a preset map of a steering torque Td—basic electric motor current value Ipsb characteristic, such as that illustrated in FIG. 8, for example, and outputs the set basic electric motor current value Ipsb to the electric power steering motor current value calculator 20g.

Figure 5:
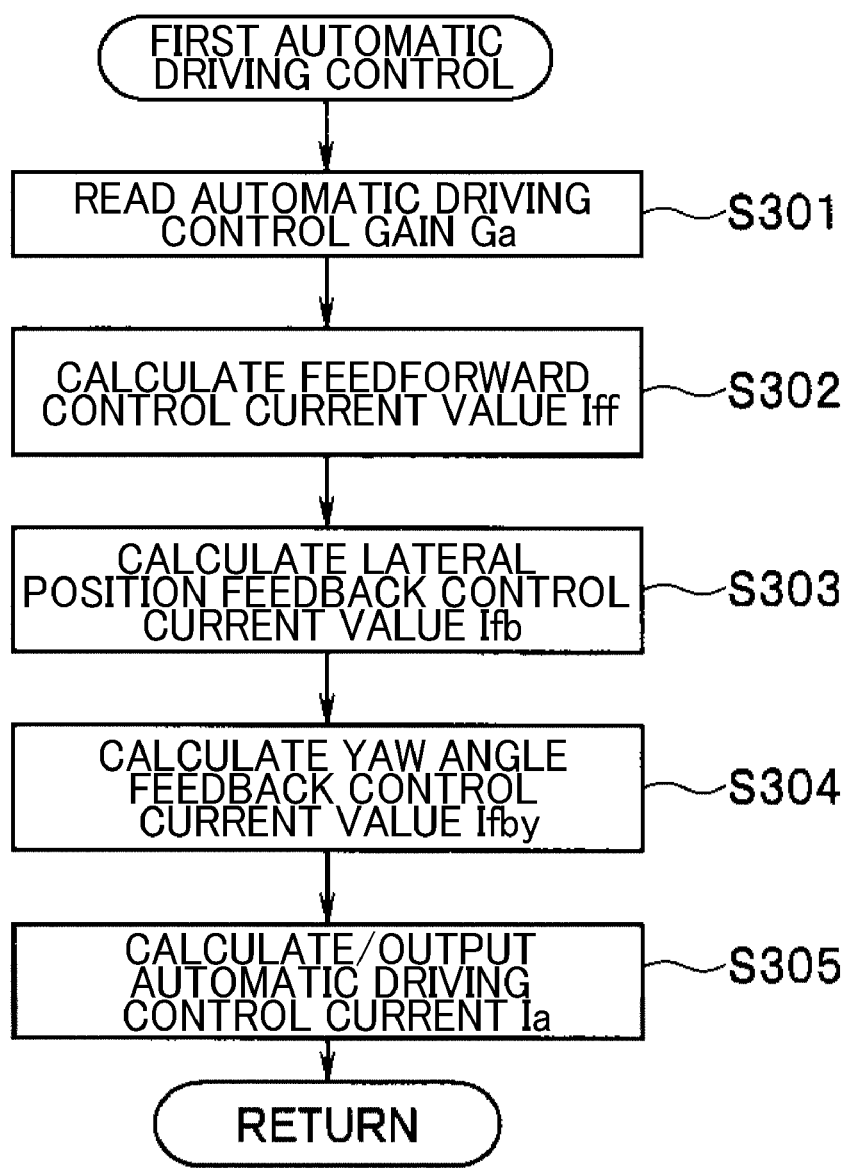
FIG. 5 is a flowchart illustrating a first automatic driving control program according to an implementation of the present invention.

The frontward environment information from the frontward environment recognition device 31, the vehicle speed V from the vehicle speed sensor 33, and the steering angle θp from the steering angle sensor 34 are input into the first automatic driving controller 20e. As described above, the first automatic driving controller 20e is a controller that performs automatic driving control along a target route (in this implementation, the center of the lane) on the basis of the frontward environment information, which is obtained on the basis of the image information obtained by the cameras. For example, the first automatic driving controller 20e calculates the automatic driving control current Ia in accordance with a flowchart of the first automatic driving control, illustrated in FIG. 5, and outputs the calculated automatic driving control current Ia to the electric power steering motor current value calculator 20g.

In the first automatic driving control, first, in S301, when the value of the control gain Ga of the automatic driving control has been output from the control selector 20c, the value is read.

The routine then advances to S302, where a feedforward control current value Iff is calculated using Equation (1) illustrated below, for example.

$$Iff = Giff \times \kappa \quad (1)$$

Here, κ denotes the curve curvature calculated on the basis of the frontward environment information using Equation (2) illustrated below, for example.

$$\kappa = (\kappa l + \kappa r)/2 \quad (2)$$

Figure 9:
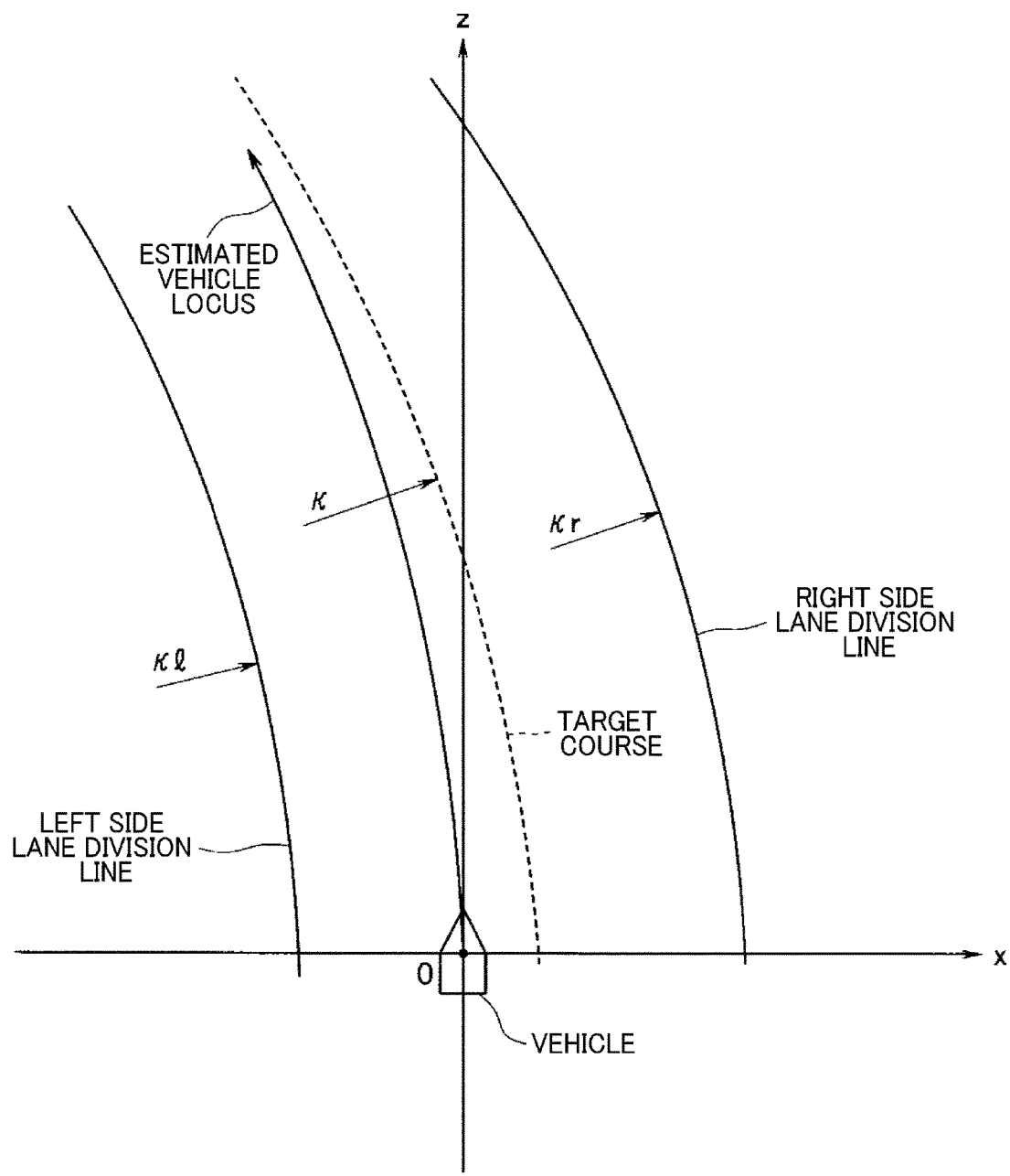
FIG. 9 is an illustrative view illustrating feedforward control according to an implementation of the present invention.

In Equation (2), κl is a curvature component corresponding to a left side white line and κr is a curvature component corresponding to a right side white line. More specifically, the curvature components κl, κr of the left and right side white lines are determined using a coefficient of a second term calculated using second order least squares in relation to points respectively constituting the left and right side white lines, as illustrated in FIG. 9. For example, when a white line is approximated using the quadratic $x = A \times z^2 + B \times z + C$, the value of 2×A is used as the curvature component. Note that the curvature components κl, κr of the white lines may denote the actual curvatures of the respective white lines. Further, Giff in Equation (1) denotes a feedforward gain set in advance by experiment, calculation, and so on.

The routine then advances to S303, where a lateral position feedback control current value Ifb is calculated using Equation (3) illustrated below, for example.

$$Ifb = Gifb \times \Delta x \quad (3)$$

Here, Gifb is a gain set in advance by experiment, calculation, and so on. Further, as illustrated in FIG. 10, Δx is calculated using Equation (4) illustrated below, for example.

$$\Delta x = (xl + xr)/2 - xv \quad (4)$$

In Equation (4), xv is an x coordinate of an estimated vehicle locus at a z coordinate of a frontward gaze point (0, zv) of the vehicle. In this implementation, zv, which is a frontward gaze distance (a z coordinate) of the frontward gaze point (0, zv), is calculated from zv=T×V. Here, T is a preset prediction time, which is set at 1.2 sec, for example.

Hence, when various elements of the vehicle, a unique stability factor As of the vehicle, and so on are used, xv can be calculated on the basis of travel conditions of the vehicle using Equation (5) illustrated below, for example.

$$xv = (\tfrac{1}{2}) \times (1/(1 + As \times V^2)) \times (\theta p/Lw) \times (T \times V)^2 \quad (5)$$

Here, Lw is a wheel base. Further, in Equation (4), xl is an x coordinate of the left side white line at the z coordinate of the frontward gaze point (0, zv), and xr is an x coordinate of the right side white line at the z coordinate of the frontward gaze point (0, zv).

Note that xv may be calculated from Equation (6), illustrated below, using the vehicle speed V and the yaw rate (dθ/dt), or from Equation (7), illustrated below, on the basis of the map information.

$$xv = (\tfrac{1}{2}) \times ((d\theta/dt)/V) \times (V \times T)^2 \quad (6)$$

$$xv = (\tfrac{1}{2}) \times \kappa \times (V \times T)^2 \quad (7)$$

Next, the routine advances to S304, where a yaw angle feedback control current value Ifby for feedback-controlling the yaw angle of the vehicle to a yaw angle in alignment with the target route is calculated from Equation (8) illustrated below.

$$Ifby = Gifby \times (\theta tl + \theta tr)/2 \quad (8)$$

Figure 11:
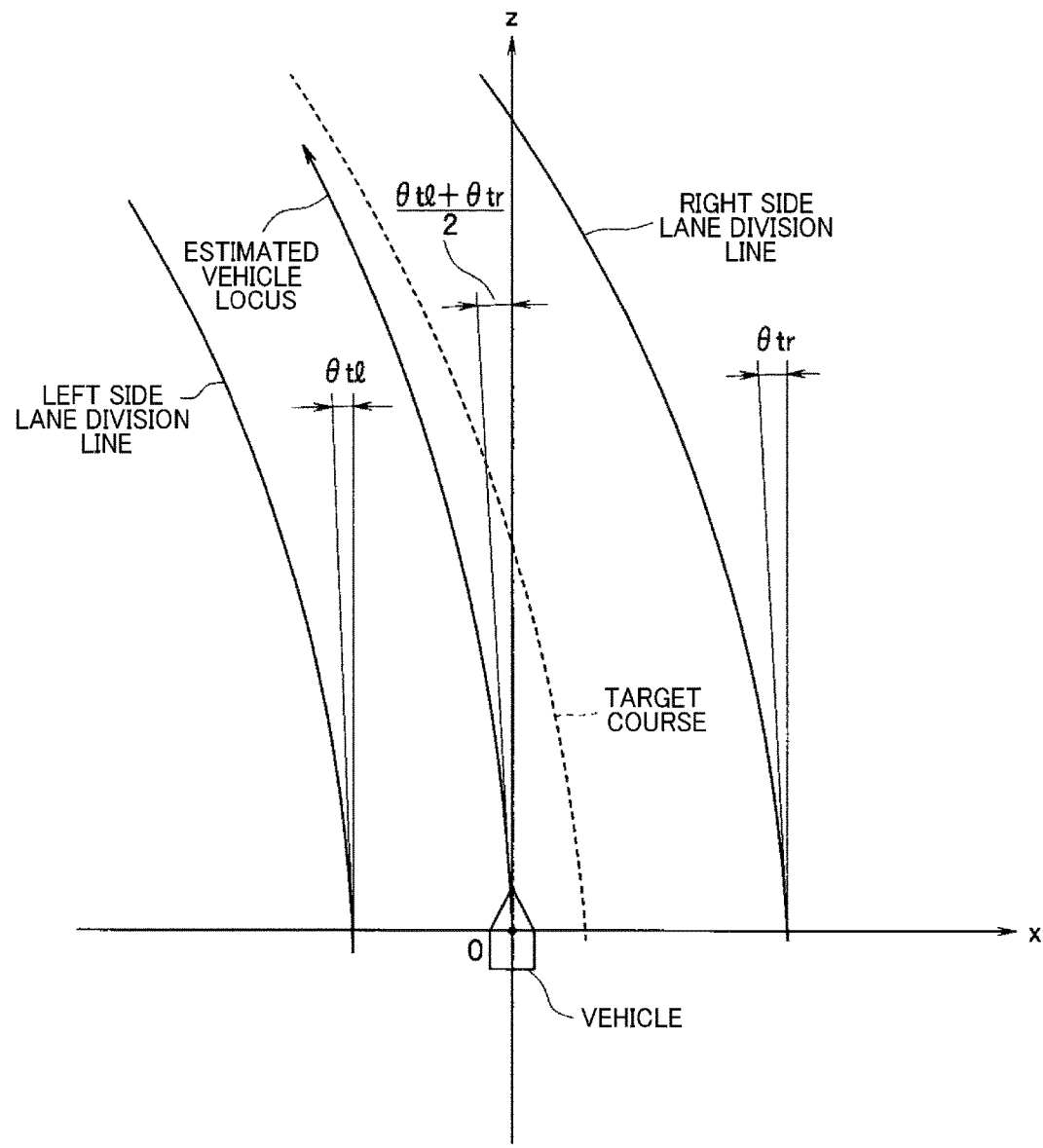
FIG. 11 is an illustrative view illustrating yaw angle feedback control according to an implementation of the present invention.

Here, Gifby is again set in advance by experiment, calculation, and so on, θtl is a tilt of the vehicle relative to the left side white line according to the image information from the frontward environment recognition device 31, and θtr is a tilt of the vehicle relative to the right side white line according to the image information from the frontward environment recognition device 31 (see FIG. 11). Note that a coefficient of a first term (in other words, a value of B when the white lines are approximated by the expression $x = A \times z^2 + B \times z + C$) calculated using the second order least squares in relation to the respective points of the white lines obtained from the image information, for example, may be used as θtl and θtr.

Next, the routine advances to S305, where the automatic driving control current Ia is calculated using Equation (9) illustrated below, for example. The calculated automatic driving control current Ia is then output to the electric power steering motor current value calculator 20g.

$$Ia = Ga \times (Iff + Ifb + Ifby) \quad (9)$$

The latest updated map data from the navigation system 32 and the map data updating unit 20b, the vehicle speed V from the vehicle speed sensor 33, the steering torque Td from the steering torque sensor 35, and the yaw rate (dθ/dt) from the yaw rate sensor 36 are input into the second automatic driving controller 20f. As described above, the second automatic driving controller 20f is a controller that sets a target route on the basis of the latest updated map information, and performs automatic driving control along the target route. The second automatic driving controller 20f calculates the automatic driving control current Ia in accordance with a flowchart of the second automatic driving control illustrated in FIG. 6, for example, and outputs the calculated automatic driving control current Ia to the electric power steering motor current value calculator 20g.

Figure 6:
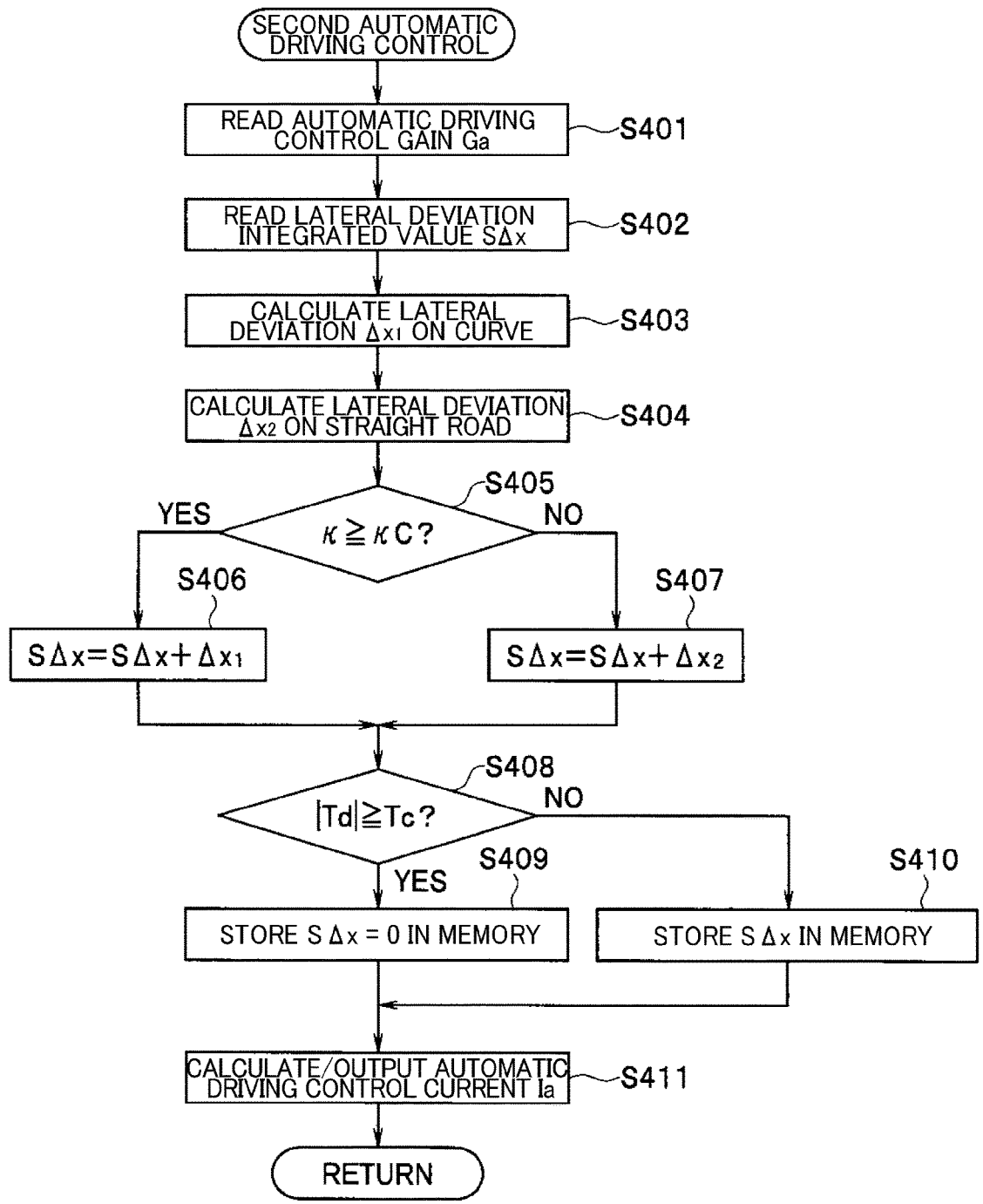
FIG. 6 is a flowchart illustrating a second automatic driving control program according to an implementation of the present invention.

In the second automatic driving control illustrated in FIG. 6, first, in S401, when the value of the control gain Ga of the automatic driving control has been output from the control selector 20c, the value is read.

The routine then advances to S402, where a currently set lateral deviation integrated value SΔx is read.

Next, the routine advances to S403, where the curve curvature κ of the travel road (the target advancement road) of the vehicle is obtained from the information indicating the node point Pn(k) closest to the position Po(k) of the vehicle, and as illustrated in FIG. 12, for example, a lateral deviation $\Delta x_1$ on a curve is calculated using Equation (10), illustrated below.

$$\Delta x_1 = \kappa - ((d\theta/dt)/V) \quad (10)$$

Here, the operand (dθ/dt)/V in Equation (10) is an operand of the curve curvature on a vehicle motion model.

Next, the routine advances to S404, where the direction of the travel road (the target advancement road) of the vehicle and the movement direction of the vehicle are obtained from the information indicating the node point Pn(k) closest to the position Po(k) of the vehicle, and as illustrated in FIG. 13, for example, a lateral deviation $\Delta x_2$ on a straight road is calculated using Equation (11), illustrated below.

$$\Delta x_2 = ((\text{direction of travel road of vehicle}) - (\text{movement direction of vehicle})) \times V \times \Delta t \quad (11)$$

Here, Δt is a sampling time.

Next, the routine advances to S405, where the curve curvature κ of the travel road of the vehicle (a value based on the map data) is compared with a determination value κc set in advance by experiment, calculation, and so on. When the curve curvature κ of the travel road of the vehicle is not less than the determination value κc (when κ≥κc), the vehicle is determined to be traveling on a curve, and therefore the routine advances to S406, where the lateral deviation $\Delta x_1$ on the curve is integrated with the previous lateral deviation integrated value SΔx (SΔx=SΔx+$\Delta x_1$).

When the curve curvature κ of the travel road of the vehicle is smaller than the determination value κc (when κ<κc), on the other hand, the vehicle is determined to be traveling on a straight road, and therefore the routine advances to S407, where the lateral deviation $\Delta x_2$ on the straight road is integrated with the previous lateral deviation integrated value SΔx (SΔx=SΔx+$\Delta x_2$).

After the lateral deviation integrated value SΔx is calculated in S406 or S407, the routine advances to S408, where a determination is made as to whether or not an absolute value |Td| of the steering torque is not less than a torque determination value Tc set in advance by experiment, calculation, and so on (|Td|≥Tc), and whether or not steering input has been generated by the driver.

When it is determined as a result of the determination of S408 that |Td|≥Tc and steering input has been generated by the driver, the routine advances to S409, where the lateral deviation integrated value SΔx is cleared (SΔx=0) and then stored in a memory. Conversely, when it is determined that |Td|<Tc and steering input has not been generated by the driver, the routine advances to S410, where the lateral deviation integrated value SΔx is stored in the memory as is.

The routine then advances to S411, where the automatic driving control current Ia is calculated using Equation (12) illustrated below, for example. The calculated automatic driving control current Ia is then output to the electric power steering motor current value calculator 20g.

$$Ia = Ga \times Gt \times S\Delta x \quad (12)$$

Here, Gt is a control gain set in advance by experiment, calculation, and so on.

In one implementation, the first automatic driving controller 20e and the second automatic driving controller 20f may be provided as an "automatic driving control execution unit".

The basic electric motor current value Ipsb from the basic motor current setting unit 20d and the automatic driving control current Ia from the first automatic driving controller 20e or the second automatic driving controller 20f are input into the electric power steering motor current value calculator 20g. The electric power steering motor current value Icmd is then calculated using Equation (13) illustrated below, for example, and output to the motor driver 21.

$$Icmd = Ipsb + Ia \quad (13)$$

Hence, according to this implementation, when the reliability of the frontward environment information is determined to be "high", the steering controller 20 executes automatic driving control reliably on the basis of the frontward environment information, and when the reliability of the frontward environment information is determined to be "low", the steering controller 20 executes automatic driving control on the basis of the map information in accordance with the reliability and the update time of the map information. More specifically, when the reliability of the map information is high and the update time is recent, automatic driving control is executed reliably on the basis of the map information. Further, when the reliability of the map information is high and the update time is old, automatic driving control in which the driver can easily intervene is executed gently on the basis of the map information. Furthermore, when the reliability of the map information is low, automatic driving control in which the driver can easily intervene is executed rapidly on the basis of the map information. Hence, when automatic driving control is implemented using the frontward environment information based on the image information and the map information, the reliability of the frontward environment information is compared with the update information relating to the map information, and the information to be used in the automatic driving control is selected appropriately. As a result, the automatic driving control can be performed with stability and a high degree of precision. Note that lane keep control for traveling along a target course was described in particular as an example of the automatic driving control, but an acceleration/deceleration control function, a lane deviation prevention function, a collision prevention function, and so on may be provided as other automatic driving control functions.

The invention claimed is:

1. A travel control apparatus for an automatic driving control of a vehicle, the travel control apparatus comprising:
    an electric power steering device to turn wheels of the vehicle according to a variable; and
    a steering controller coupled to the electric power steering device, wherein
    the steering controller configured to:
        obtain frontward environment information by recognizing a frontward environment of the vehicle, the frontward environment being recognized by at least one or more cameras that capture images of subjects outside the vehicle;
        determine a reliability of the frontward environment information in a predetermined manner;
        determine a reliability of map data of a travel region in which the vehicle travels, the travel region being obtained using position information indicating a position of the vehicle, and the reliability of map data being determined by comparing the map data of the travel region with the frontward environment information obtained by the at least one or more cameras;
        store the reliability of the map data of the travel region, the reliability of the map data of the travel region, which is stored, being updated when the vehicle travels in the travel region;
        compare the reliability of the frontward environment information corresponding to the travel region with the reliability of the map data of the travel region, and select either one of the frontward environment information and the map data for the automatic driving control; and
        execute the automatic driving control along a target route by adjusting the variable using a control gain that varies according to the reliability of the selected one of the frontward environment information and the map data and providing the variable adjusted to the electric power steering device.

2. The travel control apparatus for a vehicle according to claim 1, wherein, when the reliability of the frontward environment information is not less than a preset value and is therefore determined to be high, the steering controller selects the frontward environment information, and when the reliability of the frontward environment information is less than the preset value and is therefore determined to be low, the steering controller selects the map data.

3. The travel control apparatus for a vehicle according to claim 2, wherein
    the reliability of the map data is associated with an updated time of the reliability of the map data, and when the map data is selected, the steering controller executes the automatic driving control based on the map data at a preset control gain in a case where the reliability of the map data is not less than the preset value and is therefore determined to be high, and the update time of the reliability of the map data indicates that the reliability of the map data is updated within a preset time period.

4. The travel control apparatus for a vehicle according to claim 3, wherein, in a case where the reliability of the map data is not less than the preset value and is therefore determined to be high, and the update time of the reliability of the map data indicates that the reliability of the map data is not updated within the preset time period, the steering controller executes the automatic driving control based on the map data after modifying the preset control gain to a lower control gain than the preset control gain at a preset speed.

5. The travel control apparatus for a vehicle according to claim 4, wherein, in a case where the reliability of the map data less than the preset value and is therefore determined to be low, the steering controller executes the automatic driving control based on the map data after modifying the preset control gain to a lower control gain than the preset control gain at a higher speed than the preset speed.

6. The travel control apparatus for a vehicle according to claim 1, wherein
the reliability of the map data is associated with an updated time of the reliability of the map data, and
when the map data is selected, the steering controller executes the automatic driving control based on the map data at a preset control gain in a case where the reliability of the map data is not less than the preset value and is therefore determined to be high, and the update time of the reliability of the map data indicates that the reliability of the map data is updated within a preset time period.

7. The travel control apparatus for a vehicle according to claim 6, wherein, in a case where the reliability of the map data is not less than the preset value and is therefore determined to be high, and the update time of the reliability of the map data indicates that the reliability of the map data is not updated within the preset time period, the steering controller executes the automatic driving control based on the map data after modifying the preset control gain to a lower control gain than the preset control gain at a preset speed.

8. The travel control apparatus for a vehicle according to claim 7, wherein, in a case where the reliability of the map data less than the preset value and is therefore determined to be low, the steering controller executes the automatic driving control based on the map data after modifying the preset control gain to a lower control gain than the preset control gain at a higher speed than the preset speed.

9. A travel control apparatus for a vehicle, the travel control apparatus comprising:
a camera configured to obtain frontward environment information which is an image of a frontward environment of the vehicle; and
a controller programmed to:
calculate a reliability of the frontward environment information;
calculate a reliability of map data of a travel region in which the vehicle travels, wherein the map data of the travel region is compared with the frontward environment information corresponding to the travel region to calculate the reliability of map data of the travel region;
compare the reliability of the frontward environment information corresponding to the travel region with the reliability of the map data of the travel region, and select either one of the frontward environment information and the map data for automatic driving control; and
execute the automatic driving control to control a steering angle of the vehicle based on the selected one of the frontward environment information and the map data.

10. The travel control apparatus for a vehicle according to claim 9, wherein when the reliability of the frontward environment information is not less than a preset value, the controller selects the frontward environment information, and when the reliability of the frontward environment information is less than the preset value, the controller selects the map data.

11. The travel control apparatus for a vehicle according to claim 10, wherein
the controller stores the reliability of the map data of the drive region, the reliability of the map data of the travel region being updated when the vehicle travels in the travel region, and an update time of the reliability of the map data of the drive region being also stored, and
when the controller selects the map data, the controller executes the automatic driving control based on the map data at a preset control gain in a case where the stared reliability of the map data is not less than the preset value and is therefore determined to be high, and the update time of the reliability of the map data indicates that the stared reliability of the map data is updated within a preset time period.

12. The travel control apparatus for a vehicle according to claim 11, wherein in a case where the reliability of the map data is not less than the preset value, and the update time of the reliability of the map data indicates that the map data is not updated within the preset time period, the controller executes the automatic driving control based on the map data after modifying the preset control gain to a lower control gain than the preset control gain at a preset speed.

13. The travel control apparatus for a vehicle according to claim 12, wherein in a case where the reliability of the map data less than the preset value, the controller executes the automatic driving control based on the reliability of the map data after modifying the preset control gain to a lower control gain than the preset control gain at a higher speed than the preset speed.

14. The travel control apparatus for a vehicle according to claim 9, wherein
the controller stores the reliability of the map data of the drive region, the reliability of the map data of the travel region being updated when the vehicle travels in the travel region, and an update time of the reliability of the map data of the drive region being also stored, and
when the controller selects the map data, the controller executes the automatic driving control based on the map data at a preset control gain in a case where the reliability of the map data is not less than the preset value and is therefore determined to be high, and the update time of the reliability of the map data indicates that the reliability of the map data is updated within a preset time period.

15. The travel control apparatus for a vehicle according to claim 14, wherein in a case where the reliability of the map data is not less than the preset value, and the update time of the reliability of the map data indicates that the map data is not updated within the preset time period, the controller executes the automatic driving control based on the map data after modifying the preset control gain to a lower control gain than the preset control gain at a preset speed.

16. The travel control apparatus for a vehicle according to claim 15, wherein in a case where the reliability of the map data less than the preset value, the controller executes the automatic driving control based on the reliability of the map data after modifying the preset control gain to a lower control gain than the preset control gain at a higher speed than the preset speed.

* * * * *